US008035977B1

United States Patent
Ho et al.

(10) Patent No.: US 8,035,977 B1
(45) Date of Patent: Oct. 11, 2011

(54) APPARATUS FOR REDUCING POWER CONSUMPTION BY USING CAPACITIVE COUPLING TO PERFORM MAJORITY DETECTION

(75) Inventors: Ronald Ho, Mountain View, CA (US); Robert J. Drost, Mountain View, CA (US); Robert Hopkins, Hayward, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1762 days.

(21) Appl. No.: 11/098,724

(22) Filed: Apr. 4, 2005

(51) Int. Cl.
*H05K 7/02* (2006.01)
*H05K 7/06* (2006.01)
*H05K 7/08* (2006.01)
*H05K 7/10* (2006.01)

(52) U.S. Cl. .................... 361/760; 361/782; 361/784

(58) Field of Classification Search .......... 361/782–785, 361/803; 326/80–86; 333/24 C, 227–233, 333/239–241, 246–247
See application file for complete search history.

(56) References Cited

U.S. PATENT DOCUMENTS

| 5,629,838 | A  | * | 5/1997  | Knight et al. ............... 361/782 |
| 6,720,999 | B1 | * | 4/2004  | Holberg et al. ............. 348/222.1 |
| 6,728,113 | B1 |   | 4/2004  | Knight et al. ............... 361/760 |
| 6,825,693 | B2 | * | 11/2004 | Schoenborn et al. .......... 326/86 |
| 6,916,719 | B1 |   | 7/2005  | Knight et al. ............... 438/381 |
| 7,212,035 | B2 | * | 5/2007  | Dreps et al. .................. 326/83 |
| 7,389,097 | B2 | * | 6/2008  | Tamura ........................ 455/280 |
| 7,512,183 | B2 | * | 3/2009  | Haridass et al. ............. 375/257 |
| 7,538,633 | B2 | * | 5/2009  | Drost et al. ................. 333/24 C |
| 2003/0169128 | A1 | * | 9/2003 | Rauscher ..................... 333/175 |

* cited by examiner

*Primary Examiner* — Tuan T Dinh
(74) *Attorney, Agent, or Firm* — Park, Vaughan, Fleming & Dowler LLP; Anthony P. Jones

(57) ABSTRACT

One embodiment of the present invention provides a system that reduces power consumption by using capacitive coupling to perform a majority detection operation. The system starts by driving a plurality of signals onto a plurality of driven wires. The signals are then fed from each driven wire through a corresponding coupling capacitor to a single majority detection wire. Next, the system feeds signal on the majority detection wire and a bias voltage to a differential receiver. The output of the differential receiver switches if the signal on the majority-detection wire switches relative to the bias voltage. The system then uses the output of the differential receiver to optimize the signals from the plurality of driven wires for transmission across a long signal route. Optimizing the transmission of signals reduces the power consumed by the computer system.

14 Claims, 5 Drawing Sheets

APPARATUS FOR REDUCING POWER CONSUMPTION BY USING CAPACITIVE COUPLING TO PERFORM MAJORITY DETECTION

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

The present invention relates to techniques for improving the performance of computer systems.

Data signals in modern integrated circuits typically flow through large bundles of wires or buses, called "datapaths," which can be 32 bits wide, 64 bits wide, or even wider. Control signals are often bundled into these wide buses as well. Note that each bit on the bus can be a logical "1" or a logical "0," and different voltages can represent each of these two logical values. For example, the "0" value is typically represented by a ground voltage, and the "1" value by the power supply voltage. As computer systems continue to increase in complexity, these data bundles must often be routed over long distances across the computer system. These long routes can be on chips, on boards, or a combination of both. Because the routes are so long, they are often broken up into stages, with on-chip circuits periodically restoring, or repeating, these signals.

Transmission of these signals is often more efficient when sending one logical value than when sending the opposing logical value. For example, consider chips driving on-board traces that are resistively pulled high; if the bits are all "1"s, the driving chips do not need to overpower the pull-up resistors. Consequently, sending "1" values is more efficient than sending "0" values. Another example is the canonical domino circuit design, which consumes less power when sending a "0" than when sending a "1," because "0" values cause no changes in the circuit voltages. Therefore, if a wide datapath uses such domino circuits, transmitting "0" signals across the datapath reduces the power consumption of the circuit.

By controlling the switching of the datapath signals, a given circuit's preferences can be exploited to reduce power consumption. For example, with a circuit that prefers logical "0"s, this can be accomplished by quickly computing whether the datapath contains more "0"s than "1"s (or vice versa). If the majority of bits are "0"s, the signals are transmitted unaltered. Alternatively, if more bits are "1"s, the logical inverse of the bits is transmitted—along with a special side signal which informs the receiver that all the bits were inverted.

Such a scheme adds considerable complexity to the datapath because the scheme requires a majority detector, a signal inverter, and the side signal. Unfortunately, the majority detector consumes a significant amount of power, which reduces the total power savings of the scheme. In addition, the delay through a majority detector impacts the throughput of the datapath, because a potential majority must first be detected before data can be sent. This delay, coupled with the delay of the extra inversion stage, can significantly impact the performance of the datapath.

In other circuits, the actual transmitted values matter less than whether or not they change. Sending the same data bit repeatedly, either "1" or "0," costs little energy; but sending a pattern that repeatedly flips between a "1" and a "0" consumes a great deal of power. The power consumption of the datapath can be reduced by minimizing the number of times that the circuits switch. Minimizing the switching requires the circuit first to compare the current logical state of each bit in the datapath with its prior value. If the majority of bits did not change from the previous cycle to the current cycle, then the bits are sent without alteration. On the other hand, if the majority of bits did change, then the datapath sends the logical inverse of the data bits and asserts the special side signal to indicate the bits were inverted. In this scheme, the overhead includes per-bit comparison circuits (XORs), a majority detector, a signal inverter, and a side signal. As with the prior scheme, the power consumption of the majority detector reduces the potential benefits of this scheme. In addition, the XORs, signal inverter and majority detector introduce extra delay to the datapath.

A common element to both of these schemes is a majority detector. Majority detectors implemented in digital circuits are complex, slow, and power-hungry. Counting the majority of eight bits using simple logic gates, for example, requires detecting all possible groupings of five bits. Majority detectors built from analog differential circuits are far smaller but cannot easily scale to many bits. Analog majority detectors also suffer from design complexity and delay and power issues.

SUMMARY

One embodiment of the present invention provides a system that reduces power consumption by using capacitive coupling to perform a majority detection operation. The system starts by driving a plurality of signals onto a plurality of driven wires. The signals are then fed from each driven wire through a corresponding coupling capacitor to a single majority detection wire. Next, the system feeds the signal on the majority detection wire and a bias voltage to a differential receiver. The output of the differential receiver switches if the signal on the majority-detection wire switches relative to the bias voltage. The system then uses the output of the differential receiver to optimize the signals from the plurality of driven wires for transmission across a long signal route. Optimizing the transmission of signals reduces the power consumed by the computer system.

In a further variation, the system feeds the signal from each driven wire through a coupling capacitor to a corresponding coupled wire. The system then feeds the signal from each coupled wire to a corresponding driver for transmission across the long signal route.

The system feeds the majority detection wire and the coupled wire in parallel, thereby allowing the system to optimize the transmission of signals on the long signal route without adding delay to the long signal route.

In a variation of this embodiment, the coupling capacitor is formed by running the driven wire alongside to the coupled wire for a specific distance with a specific separation.

In a variation of this embodiment, the bias voltage can be adjusted to make the differential receiver more sensitive to small voltage changes on the majority-detection wire.

In a variation of this embodiment, optimizing the transmission of signals across the long signal route involves using an encoder to modify the logical state of the signal to accommodate a preference of a downstream-circuit for a particular logical state, or to prevent unnecessary switching during the transmission of the signals.

In a variation of this embodiment, the system uses a control signal to indicate to downstream circuitry that the signals have been optimized for transmission.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and appli-cations without departing from the spirit and scope of the present invention. Thus, the present invention is not intended to be limited to the embodiments shown, but is to be accorded the widest scope consistent with the principles and features disclosed herein.

Driving a Coupled Wire Through a Coupling Capacitor

Figure 1A:
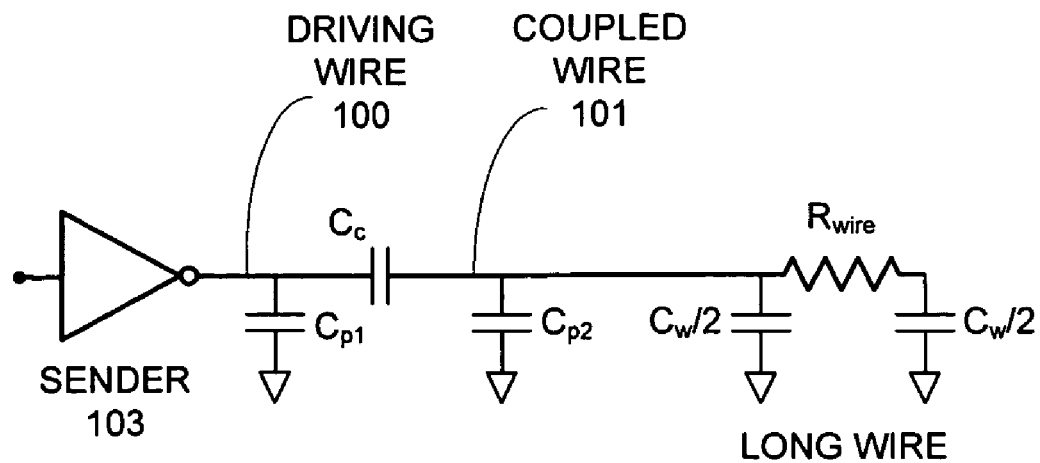
FIG. 1A illustrates driver circuit driving coupled wire through a coupling capacitor in accordance with an embodiment of the present invention.

FIG. 1A illustrates a driver (sender 103) driving coupled wire 101 through a coupling capacitor $C_c$ in accordance with an embodiment of the present invention. Note that $C_w$ represents the capacitance of the wire; $C_{p2}$ represents the parasitic capacitance associated with coupled wire 101; and $C_{p1}$ represents the parasitic capacitance associated with driving wire 100. Note also that $C_{p1}$ has no effect on the voltage seen on coupled wire 101; instead, its main effect is to slow down the voltage transition on driving wire 100.

Coupling capacitor $C_c$, acts to divide the voltage applied to driving wire 100 ($V_{DW}$), so that the voltage seen on coupled wire 101 ($V_{CW}$) is equivalent to:

$$V_{CW} = V_{DW} \cdot \left( \frac{C_c}{C_c + C_{p2} + C_w} \right).$$

By careful sizing of the coupling capacitance $C_c$ (and its parasitic capacitance $C_{p2}$), the voltage swing on coupled wire 101 can be set for the desired power consumption. For example, if a particular coupling capacitor design has a parasitic capacitance $C_{p2}$ equal to half of its coupling capacitance $C_c$, then sizing the coupling capacitor so that $C_c$ is equal to the $C_w/8.5$ results in a 10× voltage reduction—resulting in a 10× reduction in power consumption on coupled wire 101.

Because the coupling capacitor is connected in series with the downstream wire load, the effective load ($C_{eff}$) seen by the driver is reduced:

$$C_{eff} = C_{p1} + \left( \frac{C_c \cdot (C_{p2} + C_w)}{C_c + C_{p2} + C_w} \right).$$

For example, if $C_c = 2 \cdot C_{p2} = C_w/8.5$, then the $C_{eff} = 0.164 \cdot C_w$. In contrast, without a coupling capacitor $C_{eff} = C_w$; a 6× increase in the driven capacitance.

Wire Overlaps for Coupling Capacitors

Figure 1B:
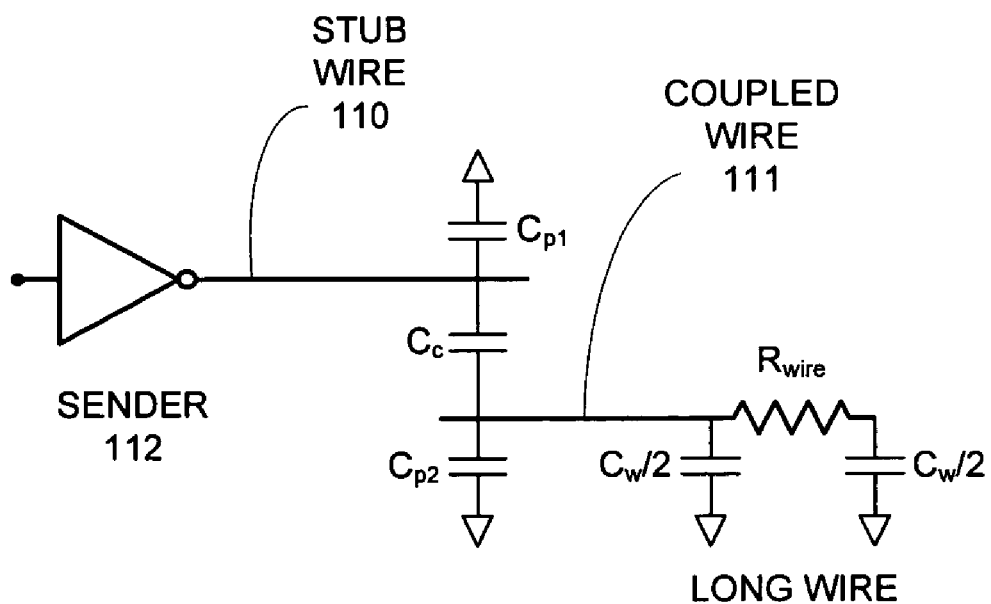
FIG. 1B illustrates a driver circuit driving a coupled wire through a coupling capacitor created by a wire overlap in accordance with an embodiment of the present invention.

FIG. 1B illustrates a driver circuit driving coupled wire 111 through a coupling capacitor $C_c$ created by a wire overlap in accordance with an embodiment of the present invention.

Because wires on a semiconductor chip typically have high aspect ratios (the wires are taller than they are wide), two wires placed side by side have a large sideways exposure to each other and a natural capacitive coupling occurs between the wires. These wires often have side-to-side coupling that is much larger than their ground coupling. With modern fabrication processes, minimum-spaced wires have side-to-side capacitance that is 70% of their total capacitance: 35% of the total capacitance is to its right-side neighbor; and 35% of the total capacitance is to its left-side neighbor.

Normally this high side-to-side coupling leads to dangerous noise problems. However, the effect can be exploited in order to capacitively couple wires. Consider driver sender 112 that drives a short stub wire 110; stub wire 110 can be placed very close to coupled wire 111, creating coupling capacitor $C_c$ between the wires. The length of the overlap determines the coupling capacitance between the wires. Because these coupled wires have large side-to-side capacitance compared to their parasitic capacitance, the parasitic capacitances $C_{p1}$ and $C_{p2}$ are small compared to $C_c$. Designing the overlap to be approximately ⅓ the length of coupled wire 111 achieves a 10× reduction in voltage swing.

The Pipelined Datapath and Majority Detection

Figure 2A:
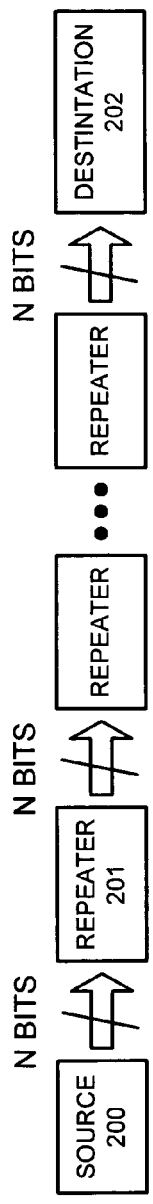
FIG. 2A illustrates a pipelined datapath in accordance with an embodiment of the present invention.
Figure 2B:
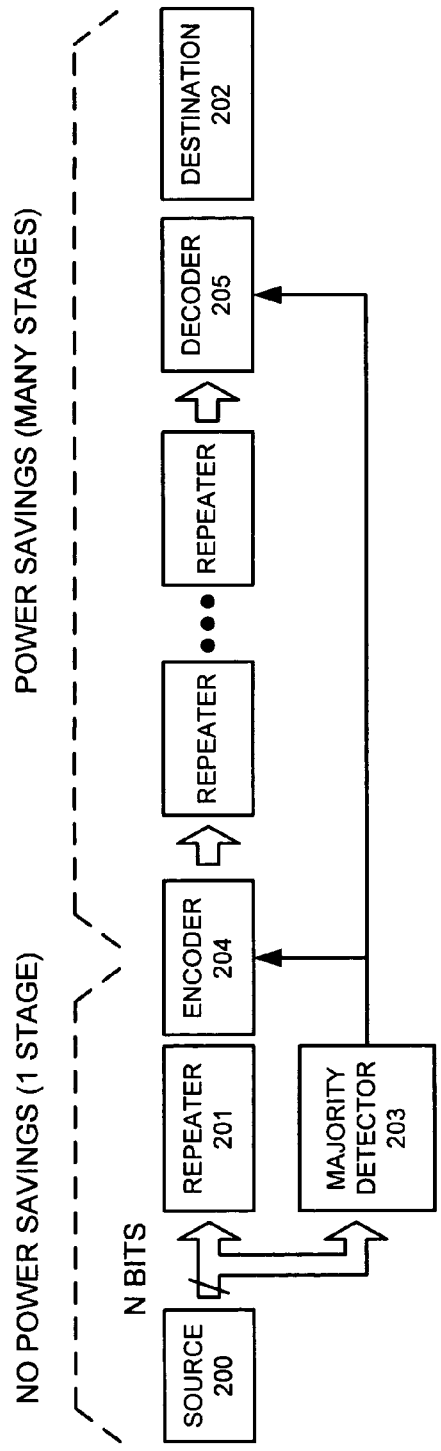
FIG. 2B illustrates a pipelined datapath with majority detection in accordance with an embodiment of the present invention.

FIG. 2A illustrates a pipelined datapath, and FIG. 2B illustrates a pipelined datapath with majority detection in accordance with an embodiment of the present invention.

In these figures, source 200 drives a number of signals to destination 202. Along the route between source 200 and destination 202, on-chip circuits such as repeater 201 periodically restore, or repeat, these signals.

In large-scale machines, datapaths can be repeated multiple times as they run between and across chips. These repeaters effectively "pipeline" the datapath, as seen in FIG. 2A.

When a datapath is pipelined, the majority detection and the encoding of the signals in the datapath can occur across two "stages." In this scheme (as seen in FIG. 2B), source 200 transmits the signals through the first stage of the datapath without any preferred data or minimized transitions. In parallel with the first datapath stage, majority detector 203 calculates the controls for power reduction and forwards the controls to encoder 204 in the next stage. If the controls are asserted, encoder 204 optimizes the datapath signals for transmission. Otherwise, if the controls are not asserted, encoder 204 transmits the signals on the long signal line without altering them. At the other end, decoder 205 receives the datapath signals. If the control signals are asserted, decoder 205 decodes the datapath signals prior to feeding the signals to destination 202. Otherwise, if the controls are not asserted, decoder 205 passes the datapath signals through to destination 202 without altering them.

This pipelining allows for the per-bit comparison and majority detection to take place in parallel with a transmission stage. Done this way, the comparison and majority detection does not delay any data flow. Otherwise, the system must wait for this computation to complete before sending any data. On the other hand, the system cannot save power for one pipeline stage. However, given a long datapath which requires twenty or more pipeline stages to transmit data from source to destination, losing one stage worth of power reduction is not a significant problem.

Creating a Majority Detector using Capacitive Coupling

Figure 3A:
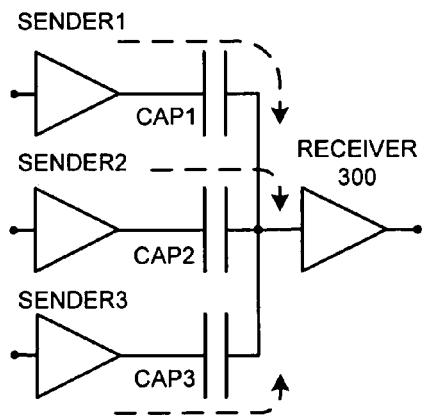
FIG. 3A illustrates a series of drivers that are capacitively coupled to the input of a receiver to form a majority detector in accordance with an embodiment of the present invention.

FIG. 3A illustrates a series of drivers (sender1, sender2 and sender3) which are capacitively coupled to the input of receiver 300 to form a majority detector in accordance with an embodiment of the present invention.

As mentioned with respect to FIG. 1A, systems using either on-chip or cross-chip capacitive coupling use capacitors for transmitting signals. When multiple senders are capacitively coupled to a single receiver, each sender (such as sender1, sender2 and sender3) transfers charge across its own capacitor (such as cap1, cap2 and cap3), and the sum of the charges appears at the receiver's input (as indicated by the dashed lines from each sender to the common node on the input of the receiver). Consequently, when all capacitors are of equal value, the charge capacitively coupled to the receiver's input from the three senders, if they all switch, is three times greater than when a single sender switches. For example, the receiver sees a voltage of 33% of the power supply if only one sender switches, a voltage of 66% of the power supply if two senders switch, and a voltage of 100% of the power supply if all three senders switch.

In this configuration, the capacitively coupled senders and the receiver form a majority detector. Hence, if the receiver has a logic threshold equal to 50% of the power supply, the receiver trips only if a majority of senders switch.

Figure 3B:
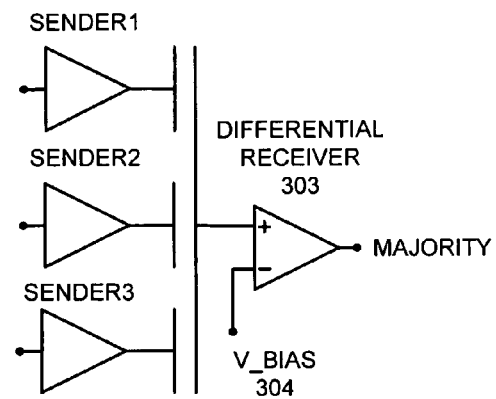
FIG. 3B illustrates a series of drivers that are capacitively coupled to the input of a differential receiver to form a majority detector in accordance with an embodiment of the present invention.

Creating a Majority Detector using Capacitive Coupling with a Biased Differential Receiver FIG. 3B illustrates senders which are capacitively coupled to the input of a differential receiver to form a majority detector in accordance with an embodiment of the present invention. Note the receiver-side plate of the coupling capacitor is drawn as a single plate, indicating that the coupling capacitor can be manufactured with a single receiver-side plate.

Controlling each capacitor to deliver exactly enough charge to switch the receiver to 1/N of the power supply (where N is the number of capacitors) proves difficult given typical process variability. Thus, a more reasonable implementation includes differential receiver 303 with a variable bias input voltage ($V_{BIAS}$ 304). Accordingly, instead of depending on the input voltage alone, the receiver can compare the input voltage with the $V_{BIAS}$ 304 when determining how many of the capacitively coupled senders switched. The differential receiver using $V_{BIAS}$ 304 is much simpler to use because the circuit designer can modify $V_{BIAS}$ 304 as needed. In addition, because of the flexibility gained by using $V_{BIAS}$ 304, the capacitors can be made much smaller, thereby saving power and delay. For example, the capacitors can be sized so that a single switching capacitor can transmit a voltage of 5% of the power supply, two switching capacitors transmit a voltage of 10% of the power supply, and all three switching capacitors transmit a voltage of 15% of the power supply. The bias voltage can then be set to 8% of the power supply to safely detect a majority of two switching capacitors. For example, the majority detector of FIG. 3B switches if two or more of the senders send "1's," and does nothing if two or more of the senders send "0's."

When using a differential receiver to detect the logical states of the input signals, a complication arises when half the bits send a "1" and the other half send a "0." In this case, no net charge appears on the receiver plate, causing the logical state of the output of the differential receiver to be indeterminate. Majority detectors for this kind of a system can be built, in which the bias voltage is less than the voltage from a single upwards switching capacitor—allowing the majority detector to detect a single plate majority.

Note that this detection of majority need not be exact. Because the goal of the circuit is to save power, in the case where barely a majority of inputs send a "1," the penalty of miscomputation is small. Thus, slight errors in capacitive matching, or in receiver offsets, may be safely ignored, which simplifies the design substantially.

Majority Detection Done in Parallel with Data Transfer

Figure 4:
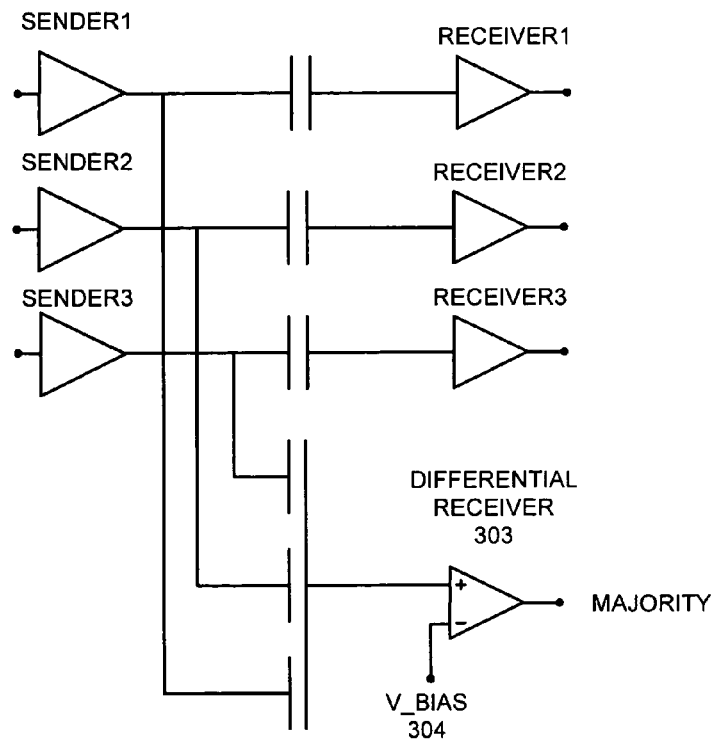
FIG. 4 illustrates a capacitively coupled circuit which detects the data majority in parallel with a data transfer in accordance with an embodiment of the present invention.

FIG. 4 illustrates a capacitively coupled circuit which detects the majority in parallel with a data transfer in accordance with an embodiment of the present invention.

This circuit transmits data on the signal lines in the same fashion as a normal capacitively coupled circuit (see FIGS. 1A-1B). In this circuit, however, the senders (sender1, sender2 and sender3) must drive the additional capacitance associated with the majority detector. Driving this additional capacitive load adds delay and energy cost, but this cost is small because for each signal line the transmission capacitors appear in series with the capacitive load of the receiver (minimizing the effective capacitance seen by the sender). Note that this circuit is 3 bits wide, but the technique can be generalized to 32, 64, or any number of bits in a datapath.

Capacitively Coupled Signals for Data Transfer and Majority Detection

Figure 5:
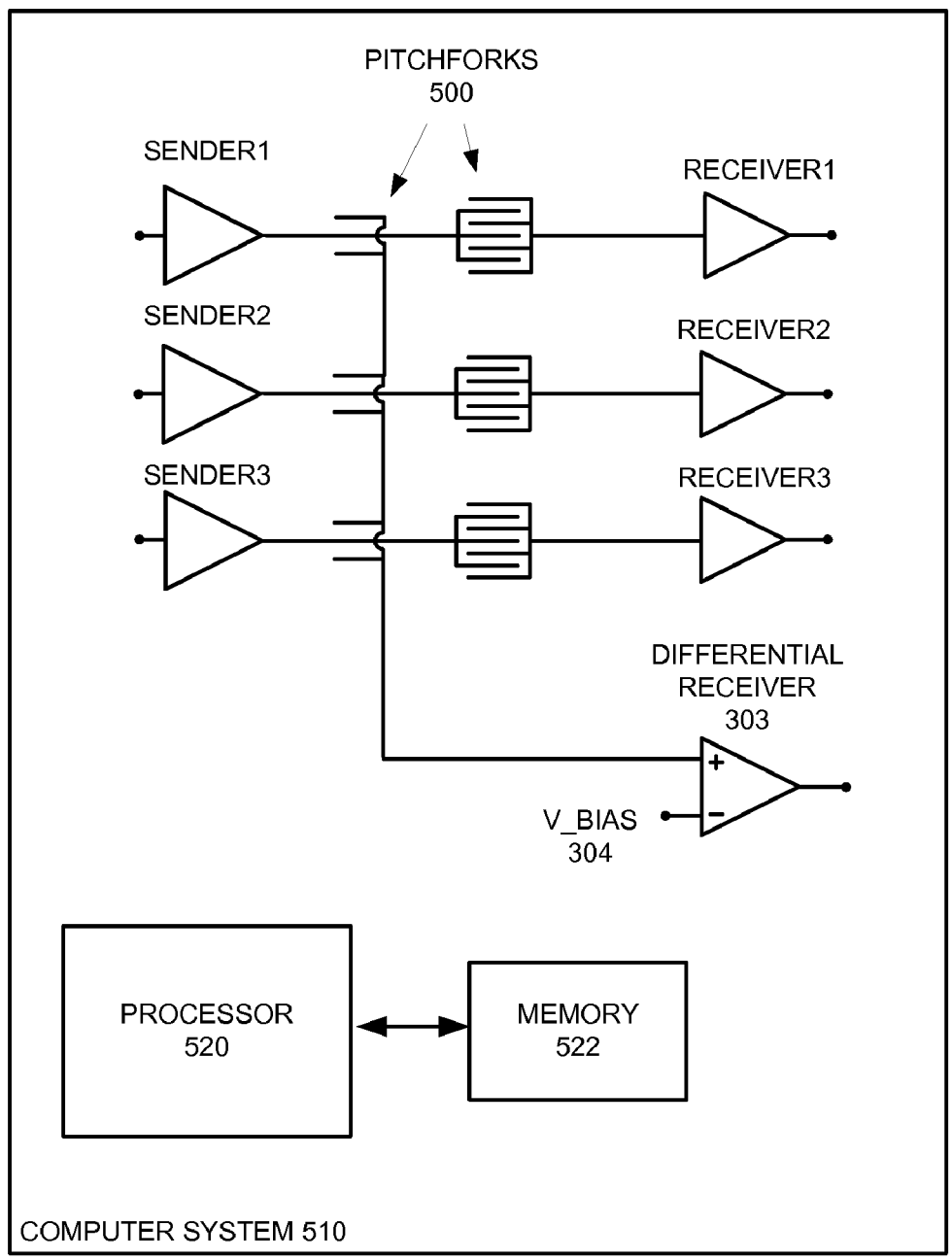
FIG. 5 illustrates a capacitively coupled circuit which detects the data majority in parallel with a data transfer in accordance with an embodiment of the present invention.

FIG. 5 illustrates a capacitively coupled circuit which detects the majority in parallel with a data transfer in accordance with an embodiment of the present invention.

In an on-chip capacitively-coupled wire system, the transfer capacitors are comprised of wires that overlap near each other, as seen in the right-side pitchfork of pitchforks 500. The majority capacitors can be made in exactly the same way, as seen in the left-side pitchfork of pitchforks 500.

Figure 6:
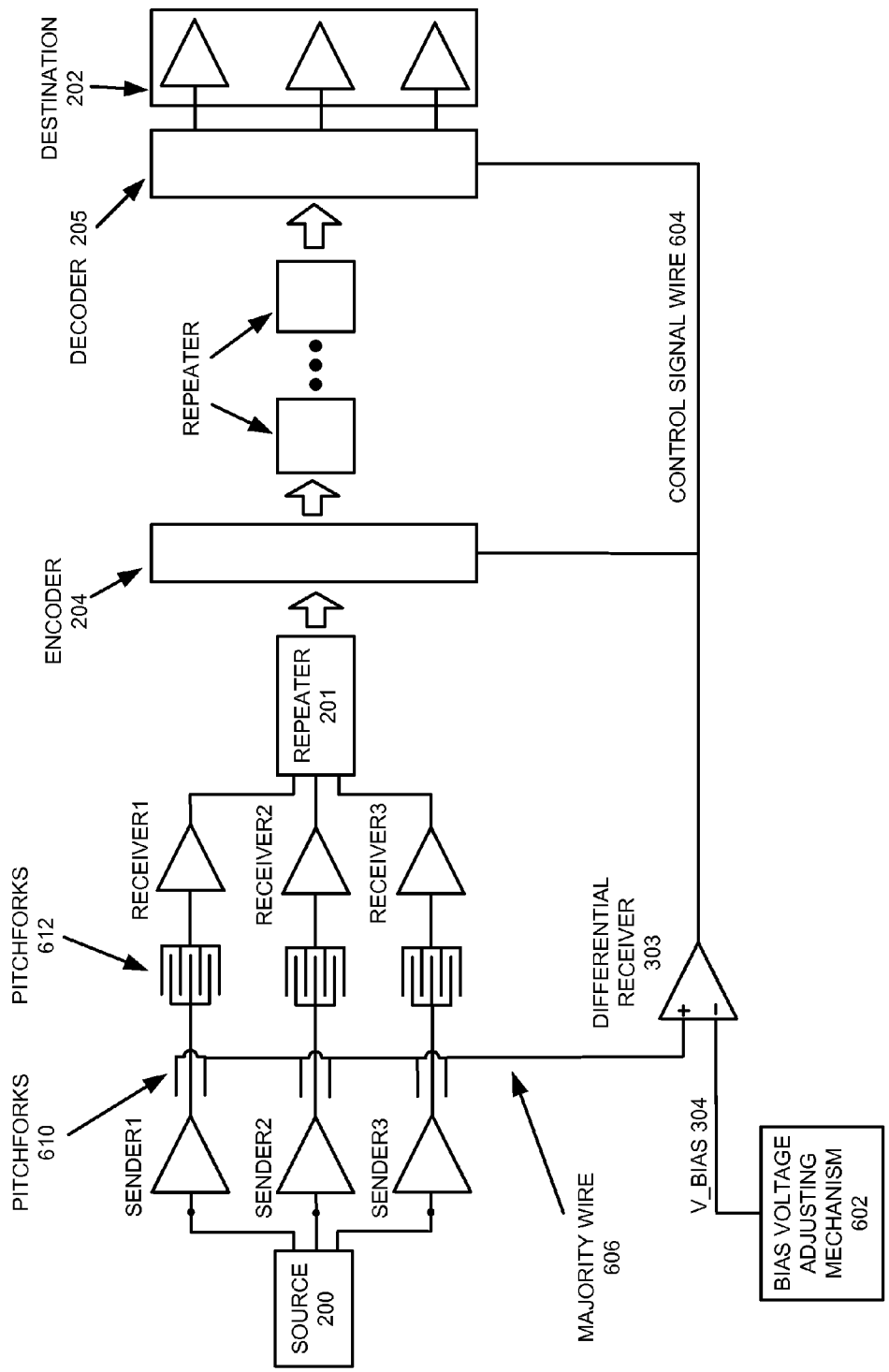
FIG. 6 illustrates a pipelined datapath that includes a capacitively coupled circuit which detects the majority in parallel with a data transfer, in accordance with an embodiment of the present invention.

FIG. 6 illustrates a pipelined datapath that includes a capacitively coupled circuit which detects the majority in parallel with a data transfer, in accordance with an embodiment of the present invention. In other words, FIG. 6 illustrates an embodiment of the pipelined datapath shown in FIG. 2B.

In FIG. 6, senders 1-3 comprise a source 200 (see FIG. 2B). Receivers 1-3 comprise repeater 201, which is coupled to encoder 204 (see FIG. 2B). As was described earlier, encoder 204 can optimize signals for transmission. As was also described earlier with reference to FIG. 2B, these signals can travel through one or more repeaters before they are decoded using decoder 205, and subsequently received at destination 202.

As described earlier with reference to FIGS. 4-5, differential receiver 303 and pitchforks 610-612 can form a majority detector. Also, as was discussed earlier with reference to FIG. 3B, bias voltage adjusting mechanism 602 can adjust bias voltage $V_{BIAS}$ 304 to make differential receiver 303 more sensitive to small voltage changes on the majority-detection wire 606. Control signal wire 604 carries a signal indicating to downstream circuitry (e.g., decoder 205) that signals on the long signal route have been optimized for transmission.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that reduces power consumption by using capacitive coupling to perform a majority detection operation, comprising:
    a plurality of driven wires that receive driven signals from a plurality of drivers;
    coupling capacitors coupled between each driven wire and a single majority-detection wire, wherein the driven signals feed from the driven wires and through the coupling capacitors onto the majority-detection wire, and wherein all the coupling capacitors are coupled to the single majority-detection wire;
    a differential receiver which receives the signal from the majority-detection wire and a bias voltage as inputs;
    wherein the output of the differential receiver switches if the signal on the majority-detection wire switches relative to the bias voltage; and
    wherein the apparatus uses the output from the differential receiver to optimize the transmission of signals from the plurality of driven wires across a long signal route.

2. The apparatus of claim 1, further comprising:
    a plurality of coupled wires;
    a second set of coupling capacitors in addition to the coupling capacitors coupled between each driven wire and the single majority-detection wire, wherein for each driven wire the second set includes a second coupling capacitor coupled between the driven wire and a corresponding coupled wire;
    a second plurality of drivers which each receive a signal from a corresponding coupled wire;
    wherein each driven signal feeds from a driven wire through a corresponding second coupling capacitor and onto a corresponding coupled wire; and
    wherein each coupled wire feeds into a driver for transmission across the long signal route.

3. The apparatus of claim 2, wherein forming the second capacitor involves running the corresponding driven wire parallel to the corresponding coupled wire for a specific distance with a specific separation.

4. The apparatus of claim 1, further comprising a bias voltage adjusting mechanism, configured to adjust the bias voltage to make the differential receiver more sensitive to small voltage changes on the majority-detection wire.

5. The apparatus of claim 1, wherein optimizing the transmission of signals across the long signal route involves using an encoder to modify the logical state of the signal to accommodate a preference of a downstream-circuit for a particular logical state.

6. The apparatus of claim 5, wherein optimizing the transmission of signals across the long signal route involves using an encoder to modify the logical state of the signal to prevent unnecessary switching during the transmission of the signals.

7. The apparatus of claim 6, further comprising a control signal wire which carries a signal indicating to downstream circuitry that the signals on the long signal route have been optimized for transmission.

8. An computer system that reduces power consumption by using capacitive coupling to perform a majority detection operation, comprising:
    a processor;
    a memory;
    a plurality of driven wires that receive driven signals from a plurality of drivers;
    coupling capacitors coupled between each driven wire and a single majority-detection wire, wherein the driven signals feed from the driven wires and through the coupling capacitors onto the majority-detection wire, and wherein all the coupling capacitors are coupled to the single majority-detection wire;
    a differential receiver which receives the signal from the majority-detection wire and a bias voltage as inputs;
    wherein the output of the differential receiver switches if the signal on the majority-detection wire switches relative to the bias voltage; and
    wherein the computer system uses the output from the differential receiver to optimize the transmission of signals from the plurality of driven wires across a long signal route.

9. The computer system of claim 8, further comprising:
    a plurality of coupled wires;
    a second set of coupling capacitors in addition to the coupling capacitors coupled between each driven wire and the single majority-detection wire, wherein for each driven wire the second set includes a second coupling capacitor coupled between the driven wire and a corresponding coupled wire;
    a second plurality of drivers which each receive a signal from a corresponding coupled wire;
    wherein each driven signal feeds from a driven wire through the corresponding second coupling capacitor and onto the corresponding second wire; and
    wherein each coupled wire feeds into a driver for transmission across the long signal route.

10. The computer system of claim 8, further comprising a bias voltage adjustment mechanism configured to adjust the bias voltage to make the differential receiver more sensitive to small voltage changes on the majority-detection wire.

11. The computer system of claim 8, wherein optimizing the transmission of signals across the long signal route involves using an encoder to modify the logical state of the signal to accommodate a preference of a downstream-circuit for a particular logical state.

12. The computer system of claim 9, wherein the second coupling capacitor is formed by running the corresponding driven wire parallel to the corresponding coupled wire for a specific distance with a specific separation.

13. The computer system of claim 11, wherein optimizing the transmission of signals across the long signal route involves using an encoder to modify the logical state of the signal to prevent unnecessary switching during the transmission of the signals.

14. The computer system of claim 13, further comprising a control signal wire, which carries a control signal indicating to downstream circuitry that the signals on the long signal route have been optimized for transmission.

* * * * *